US005640061A

United States Patent [19]

Bornhorst et al.

[11] Patent Number: 5,640,061

[45] Date of Patent: Jun. 17, 1997

[54] MODULAR LAMP POWER SUPPLY SYSTEM

[75] Inventors: James Martin Bornhorst, De Soto; John Henry Covington, Carrollton; Randall Dean Garrett, Dallas, all of Tex.

[73] Assignee: Vari-Lite, Inc., Dallas, Tex.

[21] Appl. No.: 147,284

[22] Filed: Nov. 5, 1993

[51] Int. Cl.$^6$ ........................................ H02J 9/02

[52] U.S. Cl. ........................ 307/150; 307/11; 307/31; 361/695; 361/725; 361/727; 362/85; 315/165; 315/291; 315/307

[58] Field of Search ........................ 307/150, 31, 11, 307/154, 155, 157; 361/695, 725, 727, 391; 362/88; 315/165, 307, 291, 80, 95; 223/304

[56] References Cited

U.S. PATENT DOCUMENTS

| | | | |
|---|---|---|---|
| 3,943,397 | 3/1976 | Yancey | 315/317 |
| 4,187,528 | 2/1980 | Morriss | 361/399 |
| 4,392,187 | 7/1983 | Bornhorst | 362/85 |
| 4,688,154 | 8/1987 | Nilssen | 362/147 |
| 4,772,825 | 9/1988 | Tabor et al. | 315/312 |
| 4,772,999 | 9/1988 | Fiorina et al. | 363/141 |
| 4,980,806 | 12/1990 | Taylor et al. | 362/85 |
| 5,034,853 | 7/1991 | Mazura et al. | 361/391 |

FOREIGN PATENT DOCUMENTS

| | | |
|---|---|---|
| 0239653 A1 | 3/1986 | European Pat. Off. . |
| 0274292 A1 | 11/1987 | European Pat. Off. . |
| 0382357 A1 | 1/1990 | European Pat. Off. . |
| 0390328 A1 | 2/1990 | European Pat. Off. . |

OTHER PUBLICATIONS

Advertising Literature from ETC Co. in Middleton, WI, 14 pages, Feb. 1991.

L86 Installation Rack, Electronic Theatre Controls, Inc., 1991.

Brochure/TEKTRONIX TM 500/TM5000 Modular Instruments Selection Guide, 1988.

Instruction Manual—TEKTRONIX—TM 502A Power Module, Jun. 1987.

*Primary Examiner*—William M. Shoop, Jr.
*Assistant Examiner*—Albert W. Paladini
*Attorney, Agent, or Firm*—Morgan & Finnegan, L.L.P.

[57] ABSTRACT

A modular lamp power supply is adapted to provide lamp power supply signals to a plurality of different lamps, each lamp having different power requirements. The power supply can be reconfigured to supply power to a new group of lamps simply by replacing the power circuit modules within the supply chassis.

12 Claims, 10 Drawing Sheets

MODULAR LAMP POWER SUPPLY SYSTEM

This is sufficient cabling for conventional, fixed-focus luminaires having no motorized sub-systems. For automated luminaires, however, which have motorized mechanisms for adjusting multiple parameters such as the color, focus, pan, tilt, etc., of the beam, a separate constant-voltage power circuit must be provided to supply the motors and control electronics, and control signal wiring must also be provided to connect the control electronics to some kind of manual or automated control facility. Systems of this kind are described in U.S. Pat. Nos. 4,392,187 and 4,980,806. Luminaires used in these systems usually contain a lamp power supply housed within a chassis along with the control electronics and DC power supplies used for the lamp's motors and electronic circuits. The power input cable provides a single AC power circuit for the luminaire and also provides one or two data transmission circuits for control signals and, in some cases, status reporting signals.

The means for varying the intensity of a luminaire depends upon the type of luminaire. For instance, incandescent luminaires require a dimmable power supply (often housed within the luminaire itself), while arc-lamp luminaires must be dimmed by means of a mechanical dimmer, because arc lamps require constant power.

Recently, a new configuration of automated luminaire has appeared, characterized by features that substantially reduce both the size and weight of individual luminaires. Utilizing an incandescent lamp, the luminaire connects to an external dimmer providing controlled-voltage AC electrical energy to the lamp. Thus, no lamp power supply need be enclosed within the luminaire chassis, and no mechanical dimmer need be provided, thereby reducing both the size and weight of the luminaire. Further, the DC power supply for the control electronics is housed in a companion break-out box, and serves up to six of these new luminaires. The external dimmers can be located in a rack on the floor, as described above, with cables running up into the lighting rig to the break-out boxes. The power input cable, in accordance with this new configuration, provides separate lines for lamp power, DC power for the motors and electronics, and data transmission to and from the luminaire.

The choice of luminaire type depends upon the application. Incandescent-lamp luminaires are particularly useful as flood lights for providing general area illumination, while arc-lamp luminaires are particularly useful as spot lights for illuminating a particular object or performer within that area.

In addition, some applications benefit from the higher color temperature and greater brightness of an arc lamp used in cooperation with adjustable dichroic-filter color changers. The characteristics of arc-lamp operation, however, prohibit the use of conventional (controlled voltage) dimmers to control luminaire intensity. Thus, separate lamp power supplies are required to provide controlled-power AC electrical energy to the arc lamps. For automated luminaires, the arc-lamp power supplies are frequently custom-designed to fit within an electronics housing (the chassis) of the luminaire itself.

An automated luminaire according to the new configuration, having an arc-lamp as its light source, utilizes an external lamp power supply providing controlled-power AC electrical energy to the lamp. The electrical energy applied to an arc lamp must be supplied at a constant power level, so that for whatever voltage is maintained across the electrodes of the lamp, the current supplied is modulated to regulate the power applied at a constant level. An arc-lamp power supply, therefore, provides controlled-power AC electrical energy to the lamp.

For incandescent lamps, the intensity of the light produced is proportional to the voltage applied to the lamp. A conventional dimmer, therefore, supplies controlled-voltage AC electrical energy to the lamp.

SUMMARY OF THE INVENTION

One aspect of the present invention provides a modular lamp power supply system comprising a rack-mountable chassis accepting lamp power supply modules which may be either controlled-voltage power supplies (dimmers) for incandescent lamps or, alternatively, controlled-power lamp power supplies for arc lamps. Each rack-mountable chassis includes an output connector which provides a plurality of lamp power circuits, each consisting of at least two conductors for lamp power and at least one conductor for a ground connection; each of the conductors may be doubled or tripled to provide adequate current carrying capability while utilizing a smaller and more flexible gauge of wire. One multiple circuit trunk cable connects the chassis to a break-out box in the lighting rig, which box serves a plurality of luminaires. The lamp power modules are loaded into the chassis depending upon the configuration and arrangement of incandescent wash luminaires or arc-lamp spot luminaires connected to the corresponding break-out box. If, for example, arc-lamp luminaires are connected to outputs numbered 1, 3, and 5 of the break-out box and incandescent-lamp luminaires are connected to outputs numbered 2, 4, and 6 of the break-out box, then controlled-power lamp power supply modules are loaded into chassis slots 1, 3, and 5 while controlled-voltage lamp power supply (dimmer) modules are loaded into chassis slots 2, 4, and 6. The arrangement of lamp power supply modules in the rack-mountable chassis is customized to correspond to the desired arrangement of luminaires connected to the corresponding break-out box.

Large components which are common to either controlled-voltage supplies or controlled-power supplies are housed within the chassis, while circuit configurations unique to each type of lamp power supply are contained in the removable modules. Both types of modules utilize large inductors (chokes) which are housed within the chassis; a dimmer module uses a choke to smooth current variations in the output, while an arc-lamp supply uses a choke to maintain steady current flow in a recirculating diode power supply section prior to the output. It is desirable to be able to operate the lamp power supply system on a wide range of supply voltages, from 100 VAC (for applications in Japan) to 250 VAC (for applications in Australia), including 115 VAC or 208 VAC (in the United States) and 220 to 240 VAC (for applications in Europe). Voltage selecting circuits are housed within the chassis and cooperate with the various lamp power supply modules of either type. Cooling fans, control circuits, and status sensing or indicating circuits are also housed within the chassis.

Another aspect of the present invention contemplates a lamp power supply module as described above which can be utilized as a controlled-voltage (dimmer) lamp supply module or as a controlled-power arc supply module.

BRIEF DESCRIPTION OF DRAWINGS

A more complete understanding of the present invention may be had by reference to the following Detailed Description with the accompanying drawings, wherein.

DETAILED DESCRIPTION

Figure 1A:
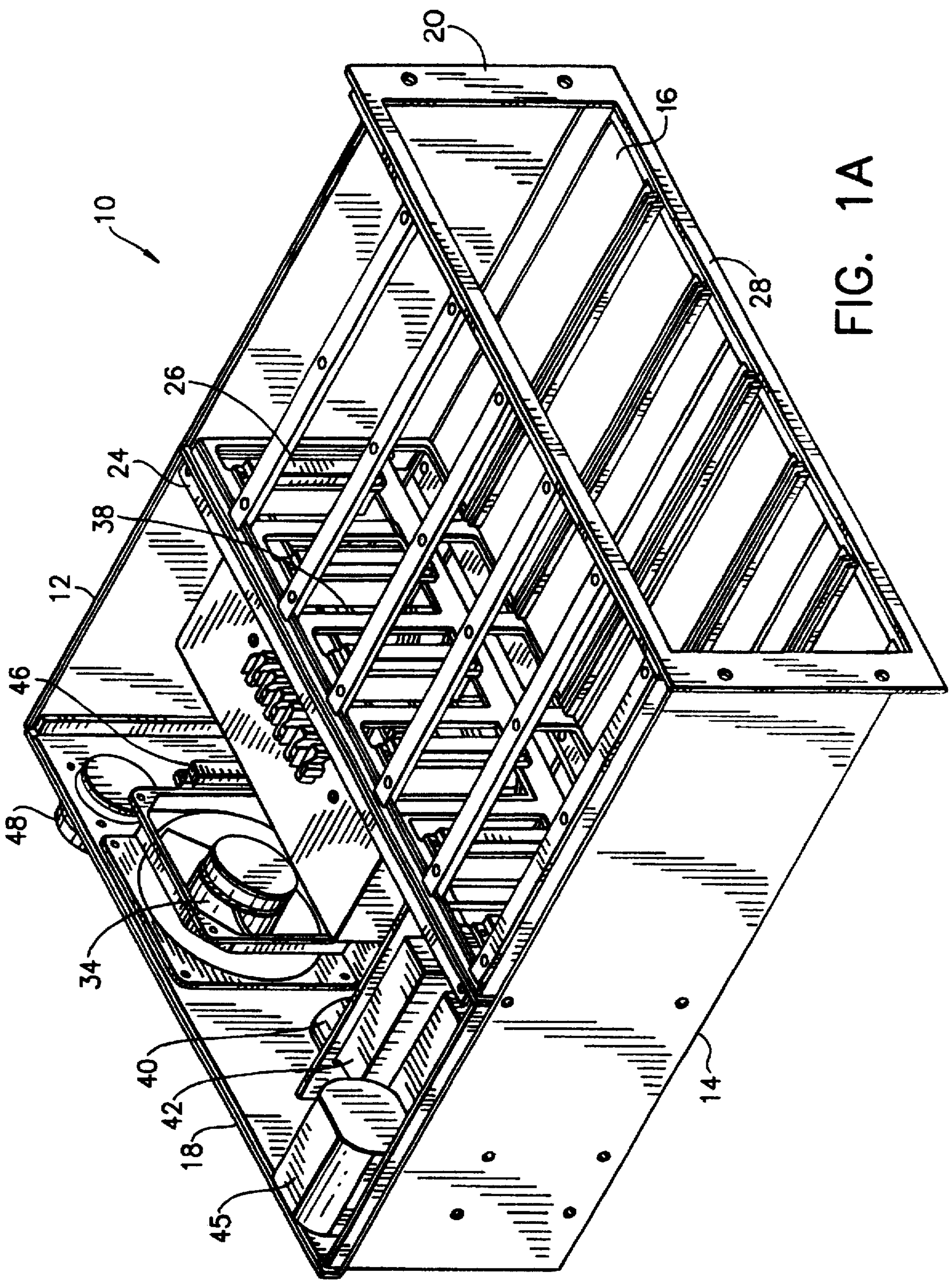
FIG. 1A is a perspective view of a modular lamp power supply chassis according to the present invention, showing the arrangement of internal features.
Figure 1B:
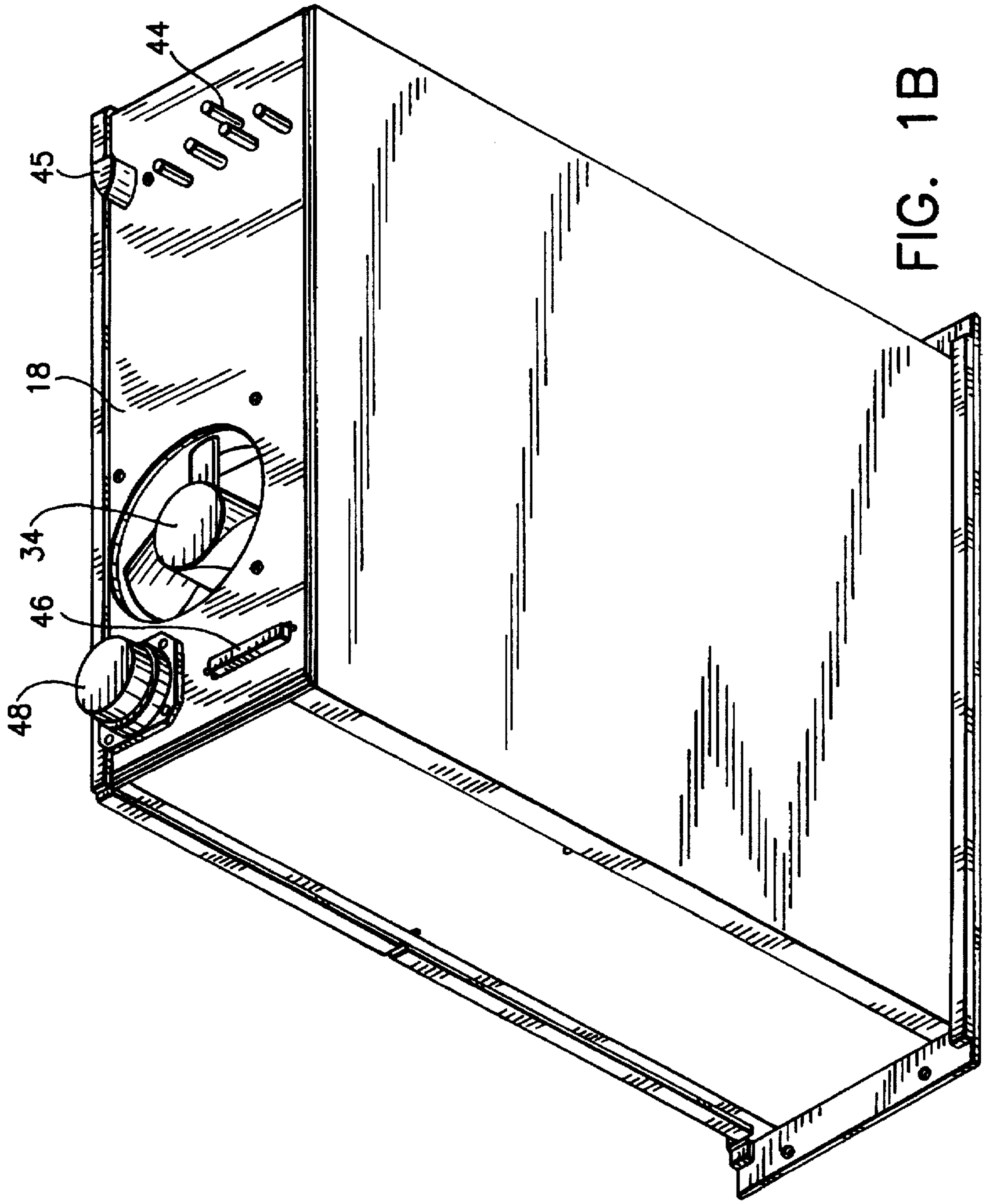
FIG. 1B is a perspective view of a modular lamp power supply chassis according to the present invention, showing rear-panel features.
Figure 1C:
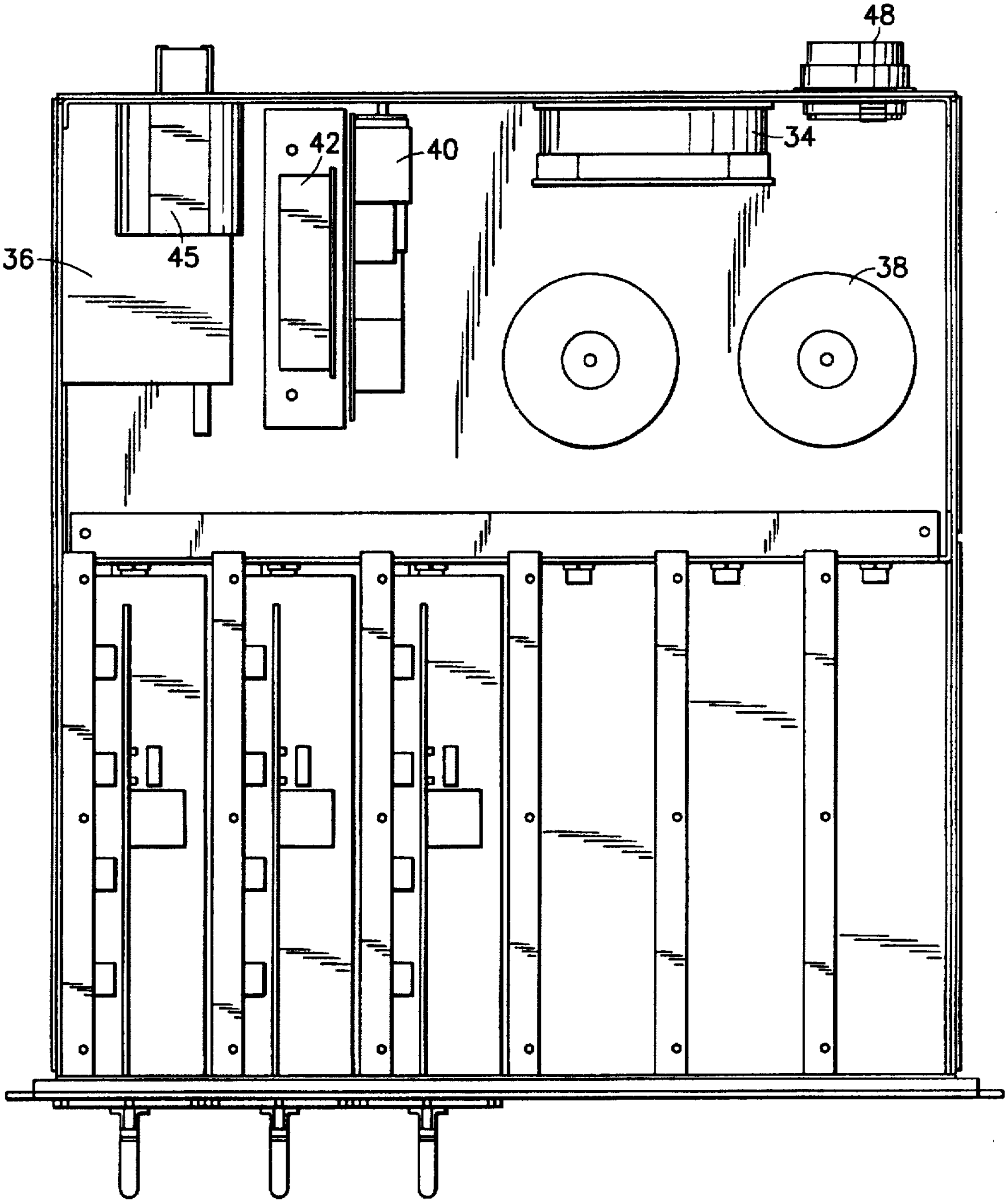
FIG. 1C is a plan view of a modular lamp power supply chassis according to the present invention, showing the arrangement of internal features.

Referring now to FIGS. 1A–1C, a chassis 10 comprising two side panels 12 and 14, a bottom panel 16, a rear panel 18, an open front panel 20, and a removable top panel (not shown), includes an interior bulkhead 24 which supports a plurality of electrical connectors 26. A plurality of channeled components or card guides 28 are fastened to the chassis bottom panel 16 forward of interior bulkhead 24, and serve to align individual lamp power supply modules with electrical connectors 26, supported by the interior bulkhead 24. The modules are inserted into the chassis through the open front panel and, when properly aligned by the card guides, mate with the electrical connectors 26 which are supported by the interior bulkhead 24. Each lamp power supply module, shown in FIGS. 2A and 2B and discussed in further detail hereinafter, includes an appropriate electrical connector 32 for mating with the connectors on the bulkhead. Components common to the modules are mounted behind the interior bulkhead, and are connected to the modules by wiring (not shown) through the connectors 26 on the bulkhead 24.

The rear portion of the chassis encloses a cooling fan 34, a power filter module 36, a plurality of toroidal inductors 38, an electronic DC power supply 40, and a voltage selector circuit 42. Electrical input terminals 44 mounted on the rear panel 18 provide a facility to connect the chassis to a source of electrical energy. A delta-wye switch 45 provides a convenient way to configure chassis input wiring for five wire sources including three phases, neutral and ground (wye configuration), or to configure chassis input wiring for four wire sources having no neutral (delta configuration). An input connector 46 mounted on the rear panel 18 provides a facility to connect the chassis to a source of electronic control signals to be described later. An output connector 48 mounted on the rear panel 18 provides a facility to connect the chassis to electrical load devices, particularly lighting instruments. The power filter module 36 is connected between input terminals 44 and the delta-wye switch 45, and prevents conduction of electromagnetic interference (EMI) and radio frequency interference (RFI) generated by the lamp power supply into the source of electrical energy.

The voltage selector circuit 42 senses the voltage of the source of electrical energy, and provides a control signal to each lamp power supply module 30. The control signal indicates whether the source voltage is in a low, 110-volt range (typically 85 to 135 volts) or a high, 220-volt range (typically 200 to 240 volts). Switching circuits in the lamp power supply modules configure those modules for operation in the appropriate voltage range depending upon the state of the control signal from the voltage select circuit.

The DC power supply 40 provides low voltage electrical energy to the lamp power supply modules 30 for operation of the modules control circuits. The power filter module 36 provides "clean" electrical energy to the lamp power supply modules 30 which modulate that energy for proper operation of electric lamps. Torroidal inductors 38 are connected to the lamp power supply modules 30 via connectors 26 supported on the internal bulkhead 24. A fan 34 is mounted on the rear panel 18 to provide forced air cooling for the lamp power supply modules 30 and other electronic components.

Figure 2A:
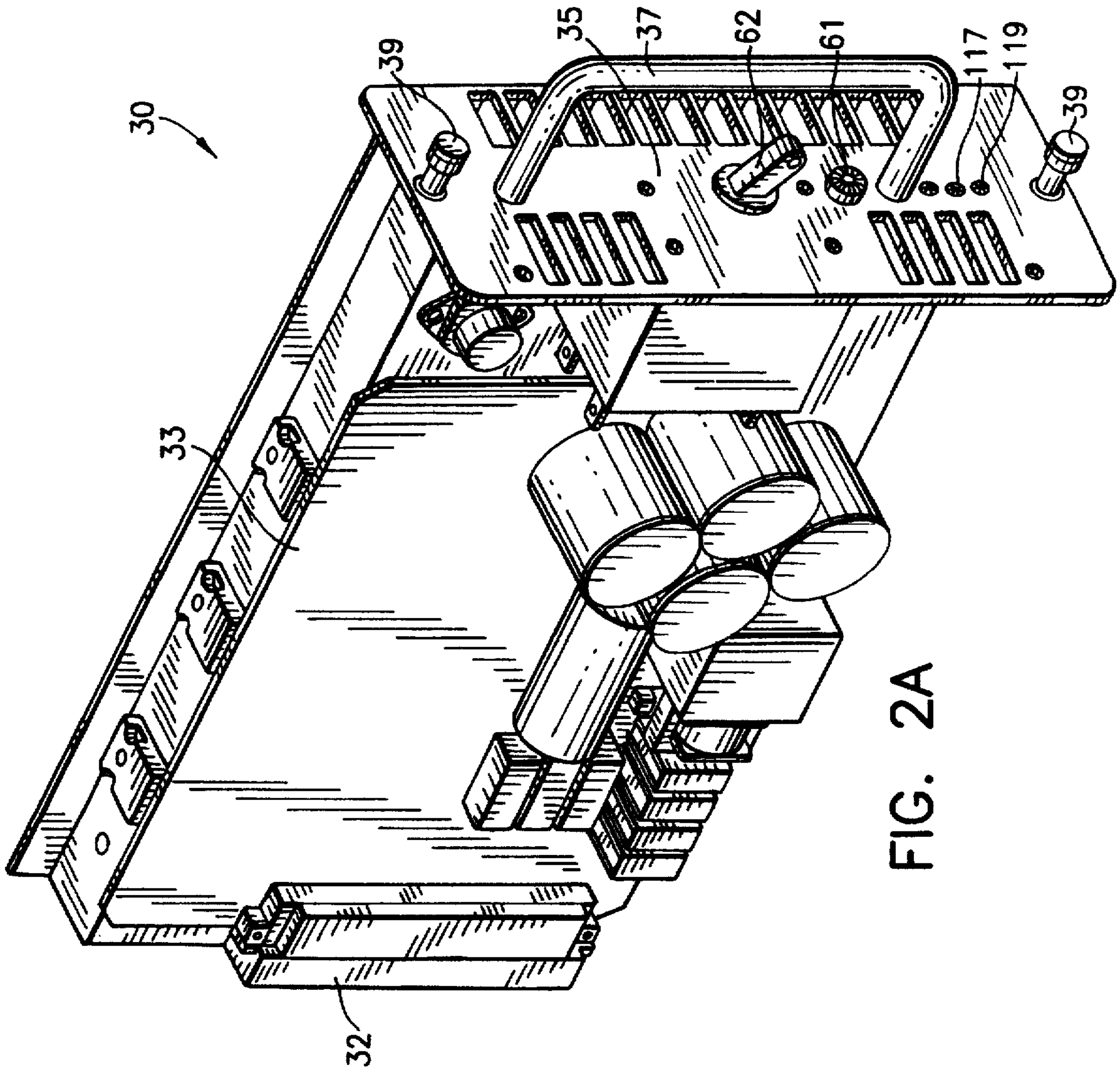
FIG. 2A is a perspective view of a lamp power supply module with cover removed.
Figure 2B:
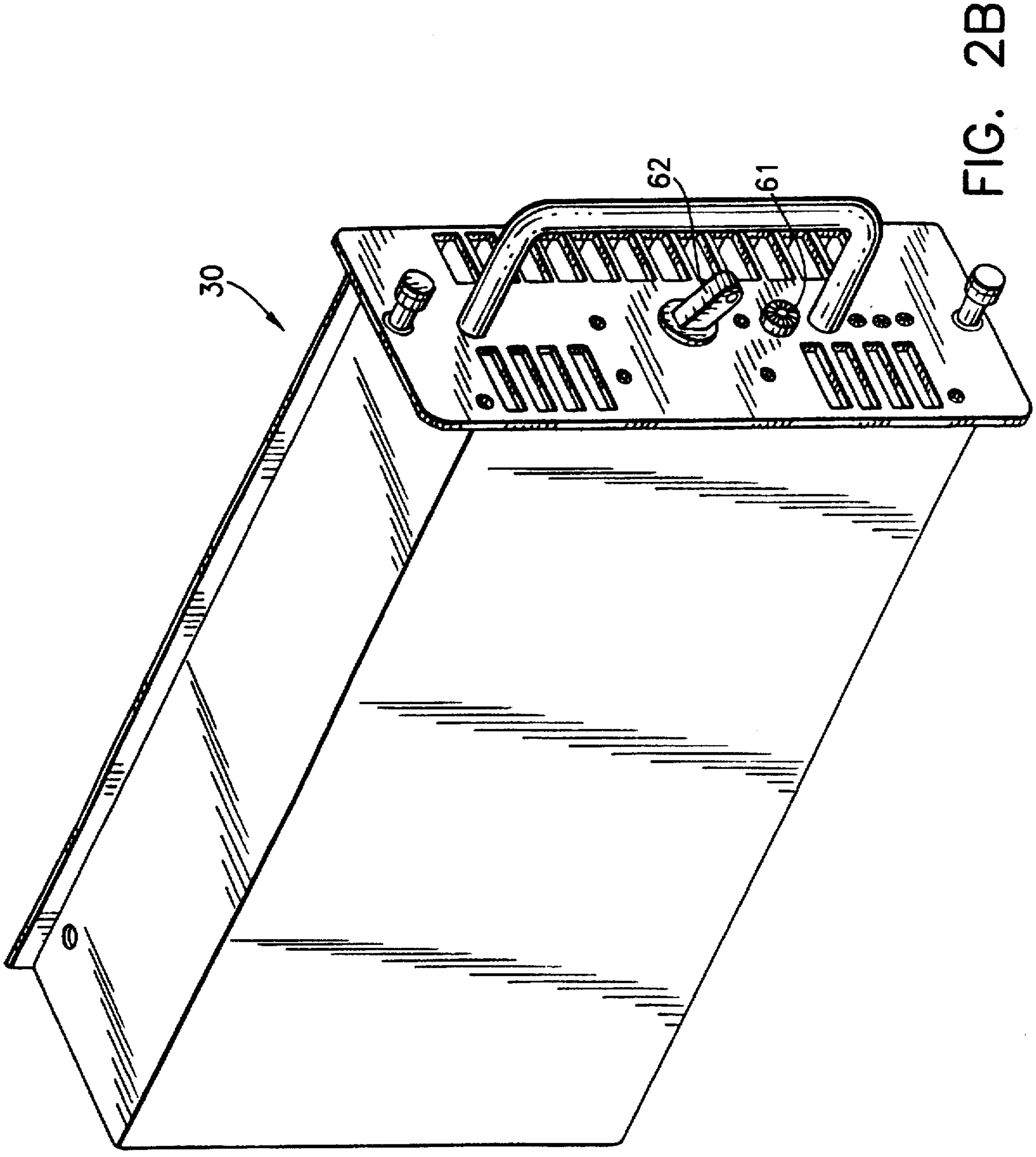
FIG. 2B is a perspective view of a lamp power supply module.

As shown in FIGS. 2A–2B, each power supply module 30 includes a printed circuit board assembly 33 mounted on an aluminum heat sink 31. An electrical connector 32 is mounted on the circuit board to mate with electrical connectors 26 on chassis bulkhead 24. A module front panel 35 includes a handle 37 for inserting the module into the chassis and removing the module from the chassis, and further includes fasteners 39 for securing the module to the chassis. A circuit breaker 62 is mounted to the module front panel and provides a convenient way to de-energize an individual module (a POWER ON/OFF switch). A power-on indicator lamp 61 and several other status indicator lamps 117, 119, 121, are also provided on the module front panel. High power electrical components, such as output transistors 71, are electrically coupled to the circuit board and are thermally coupled to the heat sink.

Power inputs from the delta-wye switch 45 and the electronic DC power supply 40, and control signal inputs from the control input connector 46 are applied to each power supply module through module connector 32. Connections to torroidal inductors 38 are also made through module connector 32. Lamp power outputs are coupled from module connector 32 to output connector 48 via wiring (not shown).

Output connector 48 provides six lamp power circuits, each consisting of at least two conductors for lamp power and at least one conductor for safety ground. Each of the conductors may be doubled or tripled to provide adequate current carrying capability while utilizing a smaller and more flexible gauge of wire than would be required if only a single conductor were used. A standardized wiring scheme is utilized so that the output of a first lamp power supply module is present on a first lamp power output circuit, while the output of a second module appears on a second circuit, and so on, such that the output of a sixth module appears on a sixth circuit.

Figure 3:
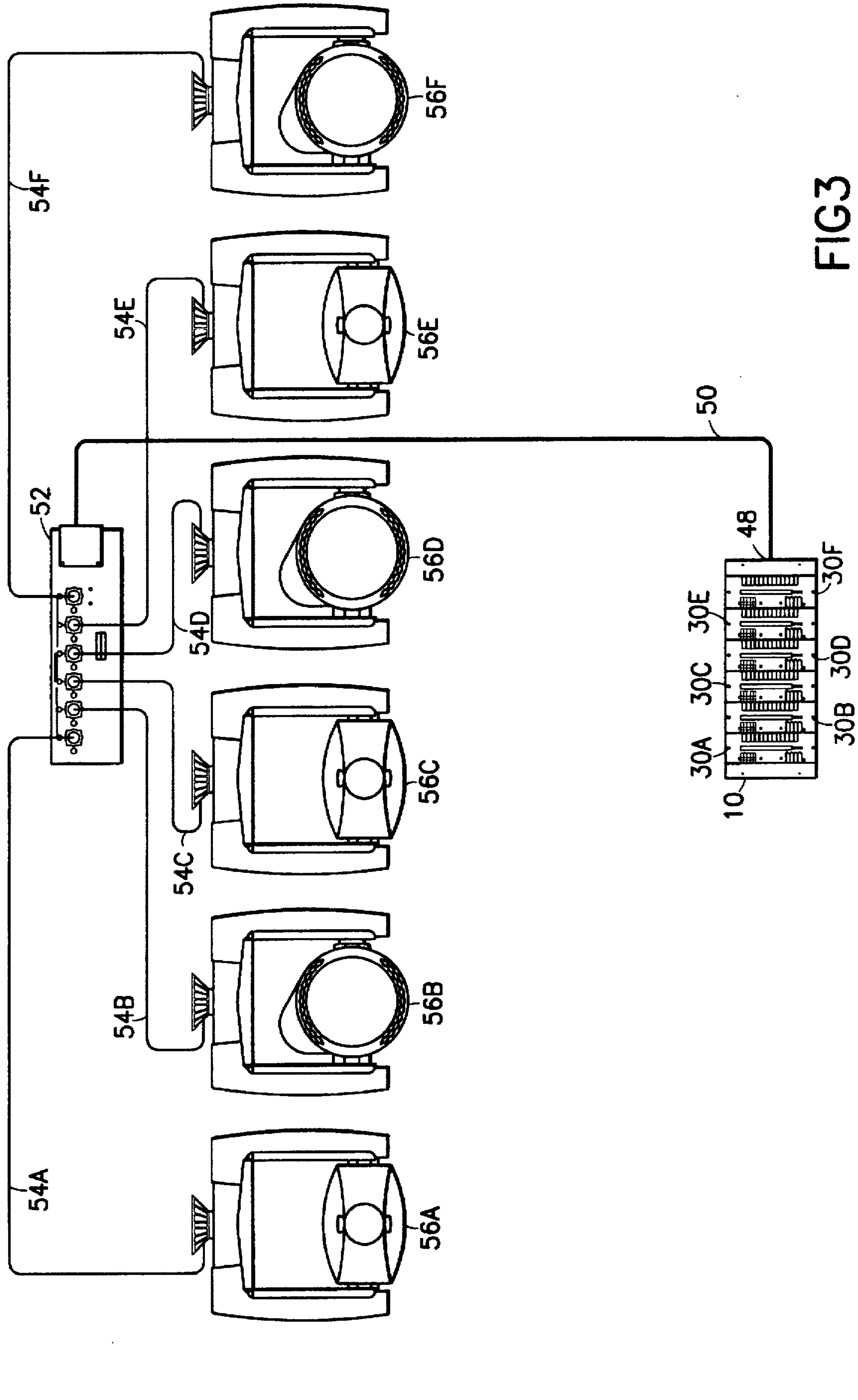
FIG. 3 is a schematic block diagram of a lighting system using a modular lamp power supply system.

As shown in FIG. 3, one multiple circuit trunk cable 50 coupled to output connector 48 conducts the six lamp power circuits to a break-out box 52 in a lighting rig, which box connects to six luminaires 56A–56F via six individual lamp cables 54A–54F. Lamp power modules 30A–30F are loaded into the chassis 10 depending upon the configuration and arrangement of incandescent wash luminaires (56B, 56D, 56F) or arc-lamp spot luminaires (56A, 56C, 56E) connected to the corresponding break-out box 52. In the present example, arc-lamp luminaires are connected to first, third and fifth outputs of the break-out box via lamp cables 54A, 54C, and 54E while incandescent-lamp luminaires are connected to second, fourth and sixth outputs of the break-out box via lamp cables 54B, 54D, and 54F. Accordingly, controlled-power lamp power supply modules are loaded into first, third and fifth chassis slots 30A, 30C, and 30E while controlled-voltage lamp power supply (dimmer) modules are loaded into second, fourth and sixth chassis slots 30B, 30D, and 30F. The arrangement of lamp power supply modules in the rack-mountable chassis 10 is thereby customized to correspond to the desired arrangement of luminaires 56A–56F connected to the corresponding break-out box 52.

If lamp power supply modules 30 are installed into chassis unit 10 in the wrong order and are not properly matched to the types of luminaries 56 attached to breakout box 52, no catastrophic failures will occur. An arc lamp driven by a conventional SCR-type intensity dimmer module will not start, the output voltage not being high enough to drive the arc lamp ignitor circuit included in the corresponding spot luminaire. A typical arc lamp ignitor circuit takes a 300-volt alternating current waveform, steps it up to 1000 volts or more through a cascade voltage multiplier formed of diodes and capacitors until a spark gap conducts the electrical energy into an auto-transformer that increases the voltage up to 20 or 30 kilo volts, which is required to ignite a typical arc lamp. When the arc lamp ignites, current drawn from the power supply module discharges an internal power supply until the output voltage stabilizes at about 65 volts. An SCR-type dimmer module provides only about 110 Vac in America or 220 Vac in Europe, neither voltage being great enough to fire the spark gap and generate a start pulse. An incandescent lamp driven from a controlled-power, arc lamp power supply module will glow at about half power, the output voltage (about 65 volts) being too low to run the incandescent lamp in the corresponding wash luminaire at full power.

Figure 4:
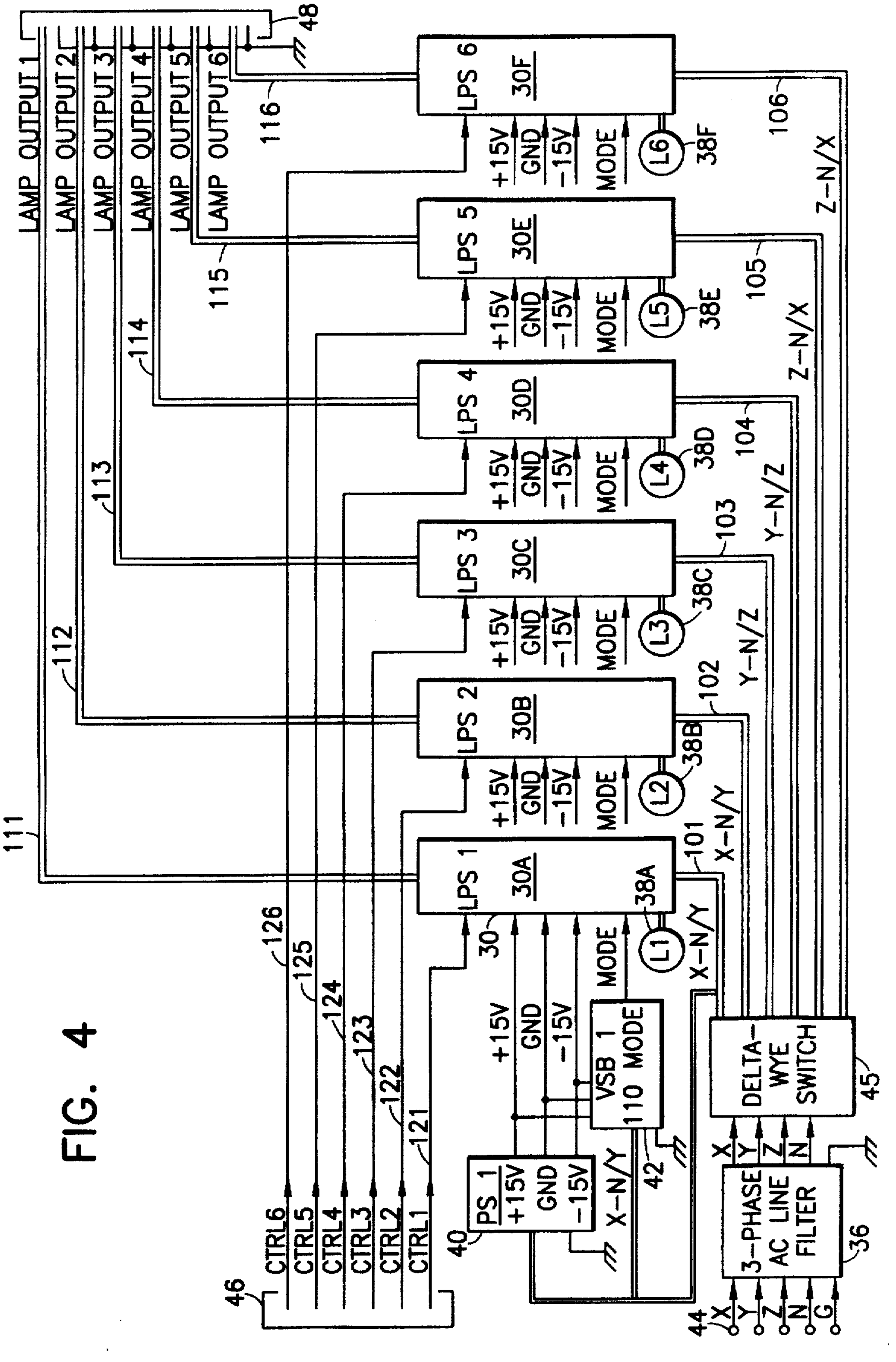
FIG. 4 is a schematic block diagram of a modular lamp power supply chassis according to the present invention.

As shown in FIG. 4, the chassis internal wiring provides connection between each lamp power supply module 30A–30F and a set of common electrical components which are shared by the modules, and a set of individual electrical components, each of which are utilized by only one such module. Input terminals 44 provide connections to a source of power via suitable cable (not shown). Internal wiring conducts three phase ac electrical energy plus a neutral line (where available) through three phase ac line filter 36 to a delta-wye configuration selecting switch 45. There is a chassis ground. Single phase ac electrical energy is conducted to each of the lamp power supply modules 30A thru 30F via ac lines 101 thru 106, each of said ac lines consisting of two conductors for phase-to-neutral (wye) or phase-to-phase (delta) power and a third conductor for ground. Two modules 30A and 30B are powered from the X phase, being X-to-Neutral (wye) or X-to-Y (delta); two modules 30C and 30D are powered from the Y phase, being Y-to-Neutral or Y-to-Z; two modules 30E and 30F are powered from the Z phase, being Z-to-Neutral or Z-to-X. Each module connects to a separate inductor 38A–38F; module 30A connects to inductor 38A, module 30B connects to inductor 38B, and so on to include module 30F which connects to inductor 38F.

Voltage select board ("VSB 1") 42 senses the ac voltage on the X-phase and produces an output signal which is shared by all lamp power supply modules 30 and used by the modules to configure the modules for operation within a low, 110-volt range or a high, 220-volt range. Power supply ("PS1") 40 accepts ac electrical energy from the X-phase and provides plus and minus 15-volt dc power which is shared by all lamp power supply modules 30 and used by the modules to operate electronic control circuits therein.

Control signals present at input connector 46 are routed to each of the modules 30 via individual wires 121 thru 126; wire 121 conducts a first control signal to module 30A, wire 122 conducts a second control signal to module 30B, and so on to include wire 126 which conducts a sixth control signal to module 30F. Lamp power output from each module 30 is conducted to output connector 48 via six individual lamp power circuits 111 thru 116; circuit 111 conducts lamp power from module 30A to certain discrete contacts in connector 48, circuit 112 conducts lamp power from module 30B to other discrete contacts in connector 48, and so on to include circuit 116 which conducts lamp power from module 30F to discrete contacts in connector 48.

The above described chassis arrangement provides a convenient way to customize the configuration of a lamp power supply unit having multiple discrete outputs available within a single output connector. Size and weight of individual circuit modules is minimized by incorporating common electrical resources such as electronic power and sensing circuits into a chassis housing, and by incorporating interchangeable individual electrical resources such as large toroidal inductors, and circuit input and output connections within the chassis housing.

Figure 5:
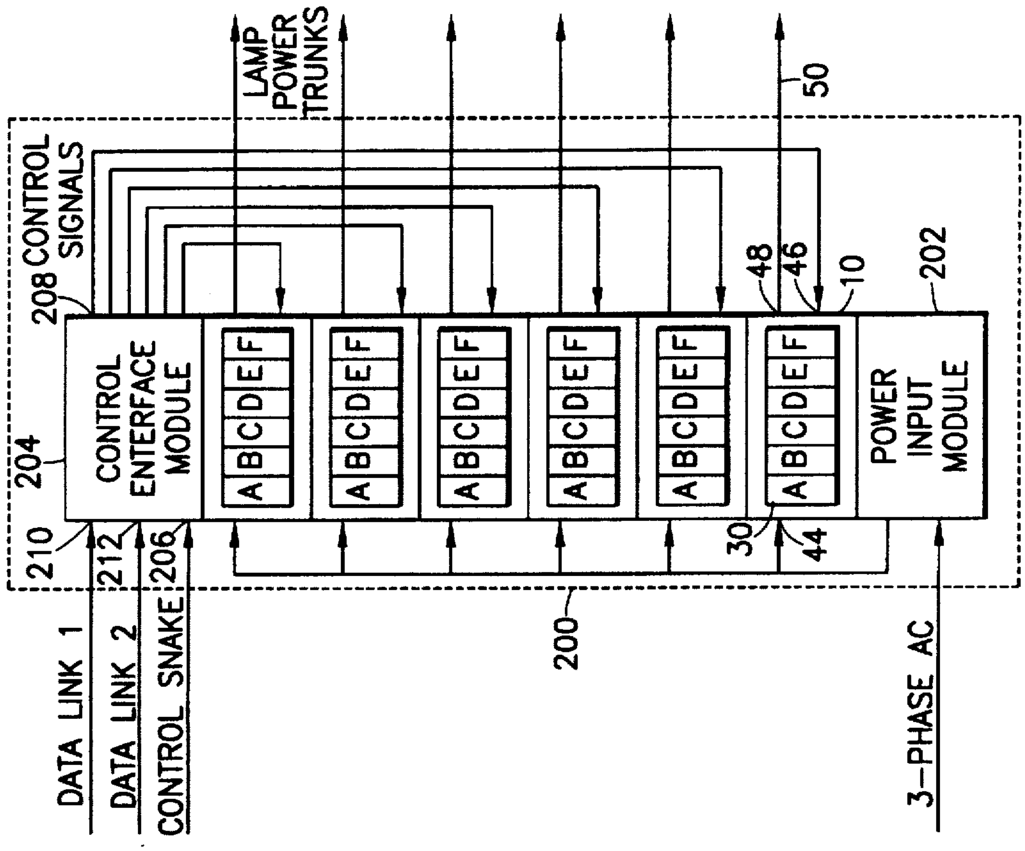
FIG. 5 is a schematic block diagram of a rack cabinet system housing plural modular lamp power supply chassis units.

As shown in FIG. 5, plural lamp power supply chassis units 10 can be mounted in a single rack cabinet 200 for convenience. An electrical power input module 202 provides connections to a high current ac electrical energy source providing up to 200 amperes of alternating current energy, typically at 208 to 220 Vac. The power input module 202 provides connections to each of the input terminals 44 on each chassis unit 10. If each lamp power supply module 30 requires 5 amperes of current, or 30 amperes per chassis unit 10, a 200-ampere input module can provide electrical energy to six chassis units for a total of 180 amperes for 36 lamp power supply modules.

A control interface module 204 can also be mounted in the rack cabinet 200 with the lamp power chassis units 10 and power input module 202. The control interface module 204 includes at least one multiple circuit input connector 206 suitable for connecting to a source of 0-to-10 volt control signals. Internal wiring distributes the control signals to a plurality of multiple circuit output connectors 208 suitable for connecting to control input connectors 46 on lamp power supply chassis units 10. One or more control "snake" cables can connect to the rack cabinet at the control interface module connector 206 and/or 207, and the signals will be distributed to the appropriate lamp power supply modules 30. The configuration of the rack cabinet 200 and of the lamp power supply chassis units 10 can be easily altered to accommodate the varying requirements of different shows, or musical or theatrical productions.

Figure 6:
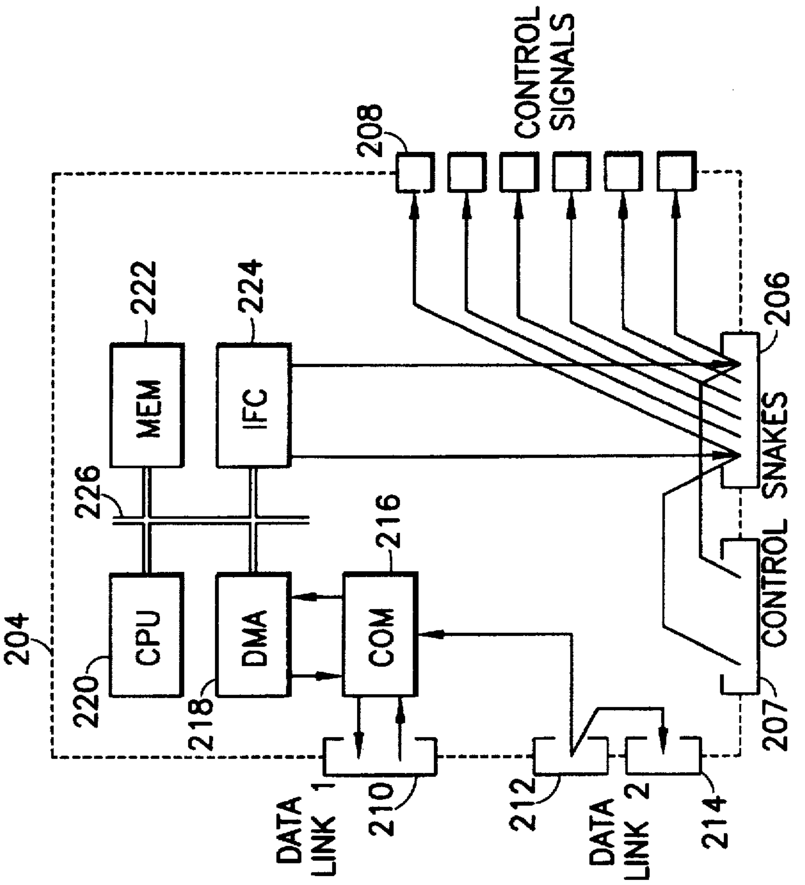
FIG. 6 is a schematic block diagram of a control input module used in the rack cabinet system.

The control interface module 204, shown in FIG. 6, includes a microprocessor-based electronic control circuit having a central processing unit (CPU) 220, local memory device 222, an interface circuit (IFC) 224, and a direct memory access (DMA) circuit 218 interconnected by a parallel bus network 226. A digital data communications circuit (COM) 216 connects to data link connectors 210, 212, and 214, and to DMA circuit 218. The CPU 220 executes programs stored in local memory 222 and controls operation of lamp power supply modules 30 housed in chassis units 10. The stored programs may provide two or more modes of operation for receiving digital data from a lighting controller and providing control signals suitable for use with lamp power supply modules 30. In one such mode, industry standard dimmer control signals such as DMX-512 signals are applied at connector 212, received and demodulated by communications circuit 216, and stored in memory 222 by DMA circuit 218. A "DMX THRU" connector 214 is provided to enable connection of multiple DMX-512 receivers in a "daisy-chain" fashion.

Under CPU control, the interface circuit 224 converts dimmer control signals received via the DMX-512 data link into 0-to-10 volt (or some other range of) analog control voltages. In another possible mode, proprietary digital control signals such as disclosed in U.S. Pat. No. 4,890,806 can be received and converted into appropriate control signals. The microprocessor-based electronic control circuit can be provided on a replaceable circuit card module so that the module can be disconnected and/or removed if not required for a particular production. The analog control voltage outputs of the interface circuit 224 are connected through protection diodes (not shown) to multiple circuit input connectors 206 and 207 and thereafter distributed via control signal output connectors 208, through suitable cabling to the lamp power supply chassis units 10 as described above.

Control signals present at output connector 208 are coupled to input connectors 46 on chassis units 10, and can be used for one of a plurality of purposes depending upon the design of each lamp power supply module 30. In one mode, control signals can be used to control intensity dimming by a standard SCR-type dimmer module. In another mode, control signals can be used to control the power output of an arc lamp power supply module, putting the supply module into a "standby" mode of operation in which power output is reduced to about one-half of the normal power output, or limiting the power output by 10 or 20 per cent to dim the lamp and/or prolong the life of the lamp.

Operating in a computer-controlled lighting system with distributed processing, such as disclosed in U.S. Pat. No. 4,860,806, control interface module 204 can recognize a "soft patch" of control channel assignments, which pairs a lamp power supply module 30 with a multiple-function luminaire 56 to obtain coordinated functionality of the lamp power supply module and associated luminaire. The control interface module receives and interprets commands addressed to the corresponding luminaire and executes certain functions depending upon the configuration of the luminaire and associated lamp power supply module. When, for example, a mechanical dimming mechanism, such as a motor-driven iris diaphragm, is closed to reduce the light output of an arc-lamp spot luminaire to zero intensity, the control interface module reduces the power output of the corresponding arc lamp power supply module to about 50 per cent in a "standby" mode, which tends to prolong the life of the arc lamp.

When it is desired to utilize analog control voltages from another source, the microprocessor-based control interface module 204 receives no digital data signals and remains inactive. Analog control voltages can be applied at connector 206. Protection diodes (not shown) prevent externally generated control signals appearing at connectors 206 and/or 207 from damaging output drivers on the control interface module. Alternatively, the control interface module can be disconnected and removed or stored in an empty card slot within its own chassis.

In another embodiment of the present invention, each lamp power supply chassis unit 10 includes individual lamp power circuit output connectors each having three contacts: two contacts for lamp power and one contact for safety ground. Each individual lamp power output is wired in parallel with the corresponding lamp power circuit in multiple circuit output connector 48. This provides a convenient way to distribute lamp power output circuits from a single chassis unit 10 among two or more multiple circuit trunk cables 50.

Figure 7:
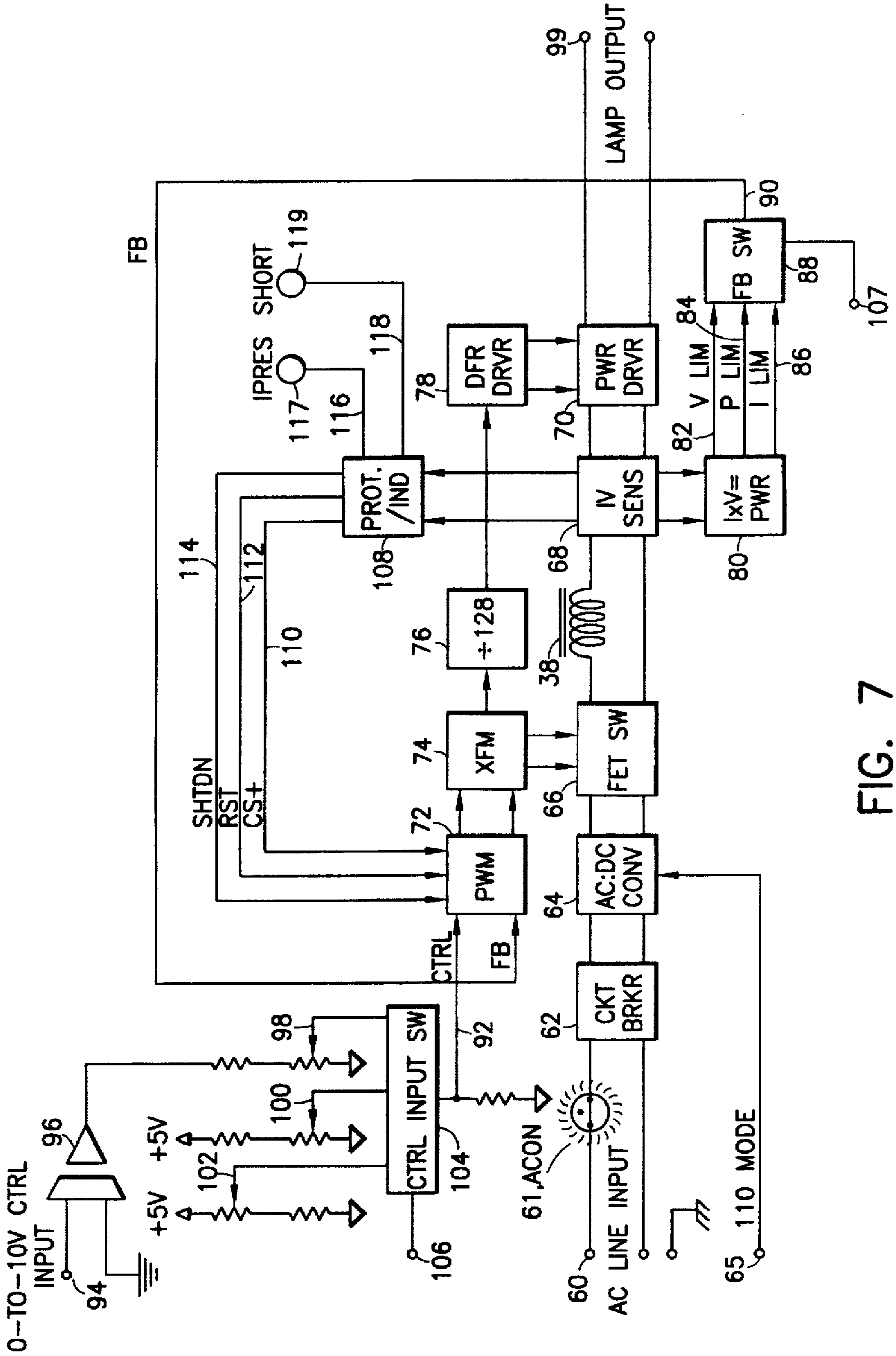
FIG. 7 is a schematic block diagram of a lamp power supply module.
Figure 8:
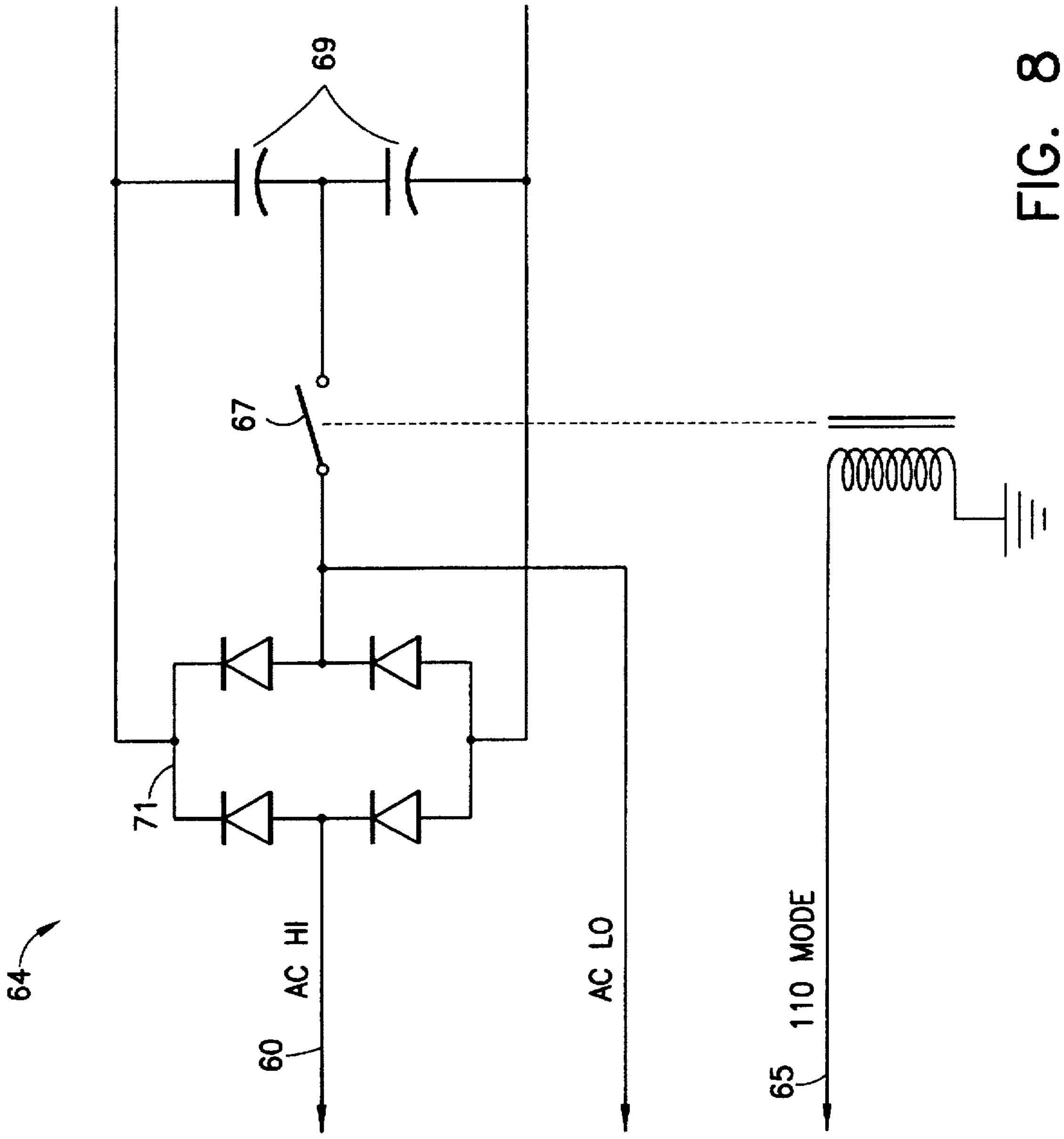
FIG. 8 is a schematic diagram of an AC-to-DC converter.
Figure 2A:
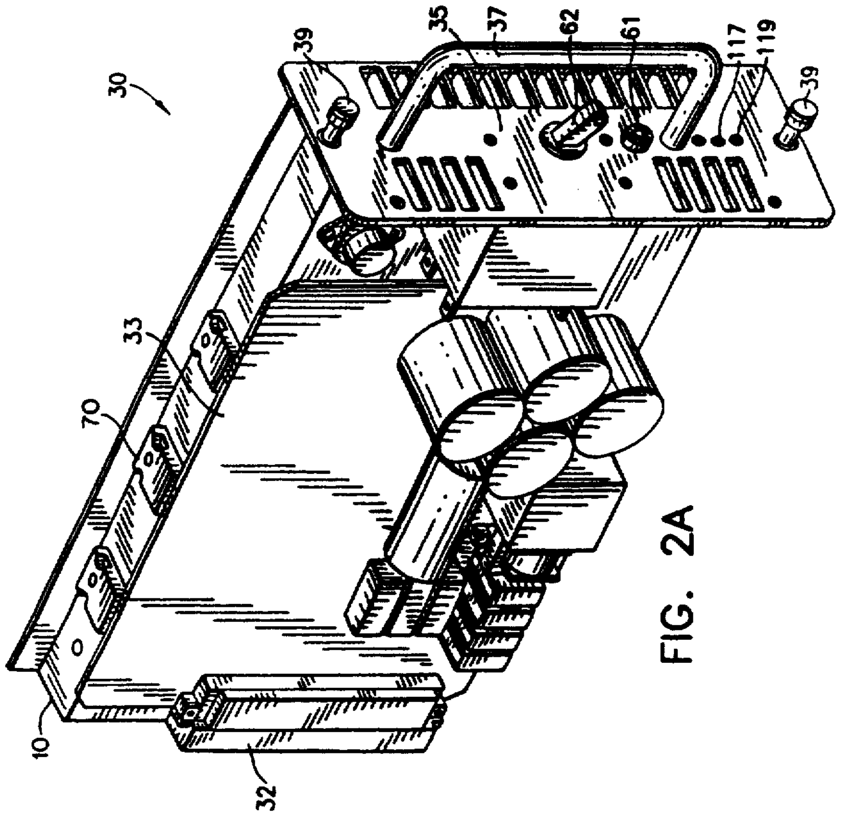
Figure 7:
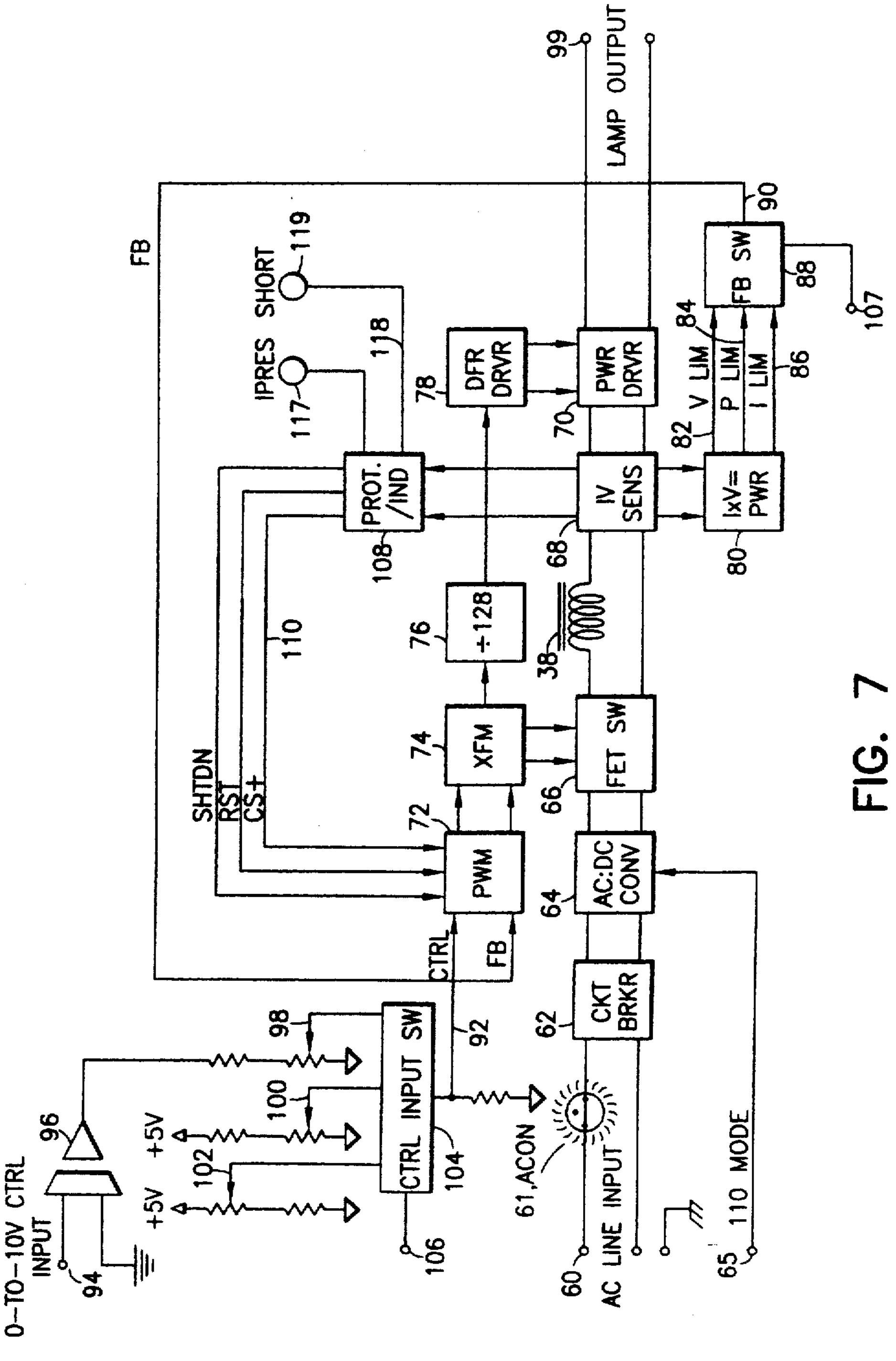

A typical lamp power supply module 30, shown in schematic block diagram in FIG. 7, connects to an ac line at input terminals 60 in module connector 32 (FIG. 2A). Circuit breaker 62 mounted on the module front panel provides protection for the module and also provides a convenient way to turn the module off, thereby dousing the lamp in the corresponding luminaire. Power-on indicator 61 is a neon lamp mounted on the front panel of module 30 and lights up when power is applied and the circuit breaker is on. As shown in FIG. 8, an AC-to-DC converter 64 includes a full wave bridge rectifier 71 and an array of capacitor filters 69. The filters can be center tapped by a normally open relay 67 which is actuated by the 110 mode control signal produced by voltage selector board 42 and connected to the module 30 at input terminal 65 in module connector 32. With the relay contacts open in 220 Mode, two capacitors in series charge to a peak voltage of about 300 volts, with half the voltage appearing across each capacitor. With the relay contacts closed in 110 Mode, one capacitor charges to a peak voltage of about 150 volts during one half cycle of the AC input voltage, while the other capacitor charges to a peak voltage of about 150 volts during the other half cycle. Each capacitor, therefore, charges to about 150 volts regardless of whether the AC input voltage is in the 110-volt range or the 220-volt range, so that AC-to-DC converter produces 300 Vdc in either mode. Converter 64 produces approximately 300 Vdc floating with respect to chassis ground, and provides that voltage to switching circuit 66.

Switching circuit 66 is driven by pulse width modulator 72 via pulse isolation transformer 74 to modulate the power level of the electrical energy provided at lamp power output terminals 99 in module connector 32. The switching circuit utilizes chassis mounted inductor 38 to maintain a smooth flow of current through power output driver circuit 70. Voltage and current sensing circuits 68 provide suitable buffering and electrical isolation between the high voltage, high current lamp power circuit and the low power control feedback circuit to be described later.

One output of pulse width modulator 72 is connected to a frequency divider circuit 76. Switching circuit 66 and cooperating inductor 38 are driven at a relatively high frequency, about 20 kilohertz, so as to minimize the size of inductor 38. Preferably, the modulator 72 operates at a frequency above the audible range of 20 to 20,000 Hertz to minimize interference with audio amplifier systems. Although some arc lamps are driven by a direct-current (DC) waveform, arc lamps driven by alternating-current (AC) waveforms exhibit less electrode erosion, which is due to metal transfer from cathode to anode in DC arc lamps. AC arc lamps are not subject to polarization as are DC arc lamps, which prolongs the life of AC arc lamps. The comparatively small volume of an arc lamp envelope tends to resonate at a specific frequency in the 20–30 kHz range, the resonance causing the light output of the lamp to vary noticeably, or flicker. The frequency at which modulator 72 operates is chosen to minimize flicker. Frequency divider circuit 76 provides a low frequency signal to differential driver circuit 78, which drives power inverter circuit 70. The low frequency is chosen to minimize losses in power inverter circuit 70. Power inverter 70 is an H-bridge circuit producing 250 volts RMS at about 156 Hz into an open circuit. Output transistors in power inverter circuit 70 are driven at a low frequency to minimize switching losses. The open circuit voltage is stepped up by a lamp ignitor circuit (not shown) in the luminaire to produce the very high voltage start pulse required to ignite the arc lamp. Once the lamp is burning, the output voltage of the power inverter 70 is controlled by the characteristics of the individual arc lamp and usually falls to about 65 volts. Current supplied to the lamp discharges the filter capacitors in AC-to-DC converter circuit 64 until the correct operating voltage is obtained. This lower voltage is too low to generate start pulses in the ignitor circuit, so the start pulse is no longer generated.

The power level at the arc lamp is maintained by a feedback control system composed of sensing circuit 68, multiplier circuit 80, and feedback selector switch 88. A feedback signal is returned via feedback line 90 to one control input of pulse width modulator 72. The feedback signal is compared with a control input signal via line 92 to modulate the on-time of switching circuit 66. Modulator circuit 72 increases the on-time to increase the current to the lamp, and decreases the on-time to decrease the current to the lamp.

The power level is set by one of two trimmer potentiometers 102 or 100. Trimmer 102 sets the power level within a comparatively high power band, while trimmer 100 sets the power level within a comparatively low power band. Control input selector switch 104 selects one of three control input signals: high power trimmer 102, low power trimmer 100, or an external control signal such as a 0-to-10 volt analog control signal applied at input terminal 94 in module connector 32. The external input signal is applied to isolation buffer amplifier 96 and thereafter through trimmer 98 to the control input selector switch 104. Switch 104 may be composed of a row of two pin headers and a programming jumper to connect the chosen control signal to the appropriate input of modulator circuit 72. Preferably, switch 104 is an electronic switching circuit actuated by a signal applied to selector terminal 106. The actuating signal applied at terminal 106 may be generated by a manually operated switch mounted on the front panel of each module 30, or may be some other electronic signal.

Multiplier circuit 80 combines a voltage sensing signal and a current sensing signal to develop a power sensing signal PLIM. To control the power level for arc lamps, a buffered current sensing signal ILIM and power sensing signal PLIM are both selected by feedback switch 88 to form feedback signal 90. The PLIM signal normally controls the power level through modulator 72 and associated circuit 74 and 66. If the current supplied to the lamp reaches the limit of which module 30 is capable of supplying, the current sense signal ILIM combines with the PLIM signal to limit the output of the module.

A significant feature of this lamp power supply module is its ability to provide controlled-power electrical energy to an arc lamp or to provide controlled-voltage electrical energy to a low-voltage incandescent lamp. A low-voltage incandescent lamp typically has a smaller filament made of a thicker, more durable wire than lamps made to run off of the standard 110 Vac line voltage. The smaller filament makes a smaller source of light, which is then easier to collect and project, and makes for a more efficient optical system of reflector, lenses and associated components. To reconfigure the module for incandescent lamp operation, control input selector switch connects the externally applied control signal at trimmer 98 to the appropriate input of modulator circuit 72, and the feedback selector switch 88 connects the buffered voltage sensing signal VLIM to the feedback input of modulator 72. In this configuration, the voltage applied to the lamp is set by the variable 0-to-10 volt analog control signal applied at terminal 94, while the output of the module is controlled by the voltage sensing signal VLIM applied through feedback selector 88 to modulator 72.

Feedback selector circuit 88 may also be composed of two, two pin headers and a programming jumper. Preferably, feedback selector 88 is an electronic switching circuit actuated by a signal applied to selector terminal 107 connected in parallel with switching control input 106. Selector circuits 104 and 88 are configured so that selection of trimmers 100 or 102 as the source of control signal 92 is accompanied by selection of PLIM and ILIM as the source of feedback signal on line 90; and selection of the external control signal via trimmer 98 is accompanied by the selection of VLIM as the source of feedback signal on line 90.

Although several embodiments of the invention have been illustrated in the accompanying drawings and described in the foregoing detailed, description, it will be understood that the invention is not limited to the embodiments disclosed, but is capable of numerous rearrangements, modifications and substitutions without departing from the scope of the invention.

We claim:

1. A modular lamp power supply, comprising:

a chassis;

means for receiving a controlled voltage lamp power supply module and a controlled power lamp mower supply module in said chassis, each of said modules supplying power to a different lamp;

output means associated with each module for delivering controlled voltage power supply outputs from said controlled voltage module, and for delivering controlled-power power supply outputs from said controlled power module; and said receiving means having means for receiving both types of modules.

2. A modular lamp power supply system, comprising:

a chassis;

a plurality of connectors in said chassis each including means for receiving lamp power supply modules having one of a plurality of characteristics;

a plurality of electrical components in said chassis accessible to each of said modules;

a plurality of electrical components accessible only by individual ones of said modules;

an AC power supply connector coupled to said chassis for receiving AC power from an external source and supplying AC power to each of said modules;

a DC power supply coupled to said AC power supply connector for providing DC power to each of said modules; and a voltage sensing circuit coupled to said AC power supply connector for sensing the voltage level supplied by said external source and generating an output signal for each of said modules indicative of said level.

3. A modular lamp unit power supply, comprising:

a chassis;

and input-power connector for coupling said power supply to an external source;

a controlled-voltage power supply module housed within said chassis and electrically coupled to said input-power supply connection;

a controlled-power power supply module housed within said chassis and electrically coupled to said input-power connection; and an output-power connector connected to receive power supply outputs from each of said controlled-voltage and controlled-power power supply modules and including means for delivering each of said power outputs to a different power conductor.

4. The power supply of claim 3, further comprising:

a voltage sensor common to each of said modules, said voltage sensor being coupled to said input-power connector and including means for generating an output signal indicative of the voltage level at said input-power connector.

5. The power supply of claim 3, wherein each of said modules is coupled to a separate inductor external of said modules and housed within said chassis.

6. The power supply of claim 3, further comprising a single DC power supply coupled to a plurality of said modules, said DC power supply supplying power for operation of electronic circuitry of each of said modules.

7. The power supply of claim 3, further comprising a plurality of dedicated input lines, each of said lines being dedicated to a different one of said modules, said lines providing electronic control signals to said modules from an external control device.

8. A modular power supply adaptable to provide power to a plurality of different lamps having differing power requirements, comprising:

a chassis;

a plurality of connectors in said chassis adapted to receive power supply modules of a plurality of different configurations;

a plurality of power supply modules each connected to a different one of said connectors, said modules having one of a plurality of different power generating characteristics;

a plurality of common electrical components within said chassis arranged to be shared by said plurality of power supply modules;

a plurality of individual electrical components within said chassis each arranged to be used by a different one of said power supply modules.

9. The modular power supply of claim 8, wherein said plurality of common components includes a DC power supply for supplying power.

10. The modular power supply of claim 8, wherein said plurality of common components includes a voltage sensor coupled to an input power connector, said voltage sensor generating an output signal indicative of the voltage level at said input power connector, said output signal being coupled to each of said plurality of power supply modules.

11. A power supply of claim 2, wherein at least one of said modules is a dimmer module for providing power to at least one incandescent lamp.

12. A power supply of claim 2, wherein at least one of said modules is a controlled-power lamp power supply module for providing power to at least one arc lamp.

* * * * *

UNITED STATES PATENT AND TRADEMARK OFFICE

CERTIFICATE OF CORRECTION

PATENT NO. : 5,640,061
DATED : June 17, 1997
INVENTOR(S) : Bornhorst et al.

It is certified that error appears in the above-indentified patent and that said Letters Patent is hereby corrected as shown below:

In column 1, line 1, after "MODULAR LAMP POWER SUPPLY SYSTEM", insert the following:

BACKGROUND--FIELD OF INVENTION

The present invention relates to lamp power supplies for use with stage or entertainment lighting.

BACKGROUND AND DISCUSSION OF PRIOR ART

When lighting a stage or other performance area, it is the usual practice to hang lighting instruments or luminaires from pipes or trusses above the area and locate the luminaires' lamp power supplies, or intensity "dimmers", on the floor adjacent to the area, closer to a source of electrical energy. Dimmers can be heavy and, where there is no special need for them to be hung with the luminaires, it is usually simplest and most practical to put the dimmers in one place, such as in a rack upon the floor, close to the power source, where they are accessible for maintenance.

When it is desired to power incandescent lamps, power cables are run from a dimmer rack up into the lighting rig to carry controlled-voltage AC electrical energy to the lamps in the luminaires. To minimize the number of separate cables which must be run up into the lighting rig, as many as six separate power circuits, each consisting of two power conductors and a safety ground

UNITED STATES PATENT AND TRADEMARK OFFICE

CERTIFICATE OF CORRECTION

PATENT NO. : 5,640,061 Page 2 of 2

DATED : June 17, 1997

INVENTOR(S) : Bornhorst et al.

It is certified that error appears in the above-indentified patent and that said Letters Patent is hereby corrected as shown below:

conductor, can be combined into one multiple-conductor cable. Once in the rig, the cables are connected to a "break-out box" which provides six separate output connections for individual luminaires.

Signed and Sealed this

Seventh Day of October, 1997

Attest:

Bruce Lehman

BRUCE LEHMAN

Attesting Officer

*Commissioner of Patents and Trademarks*

UNITED STATES PATENT AND TRADEMARK OFFICE

CERTIFICATE OF CORRECTION

PATENT NO. : 5,640,061

DATED : June 17, 1997

INVENTOR(S) : Bornhorst et al

It is certified that error appears in the above-identified patent and that said Letters Patent is hereby corrected as shown below:

In the Drawings,

Please delete FIG. 2A and insert the enclosed FIG. 2A;

Please delete FIG. 7 and insert the enclosed FIG. 7;

Column 4, line 28, before "119", please insert -- and --;

Column 4, line 28, delete ", 121,"; and

Column 4, line 29, change "71" to "70".

CERTIFICATE OF CORRECTION

PATENT NO. : 5,640,061

DATED : June 17, 1997

INVENTOR(S) : Bornhorst et al

It is certified that error appears in the above-identified patent and that said Letters Patent is hereby corrected as shown below:

Delete Drawing Fig.2A and Fig. 7, and substitute therefor the Fig. 2A and Fig. 7, as shown on the attached pages.

Signed and Sealed this

Seventeenth Day of March, 1998

Attest:

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,640,061

DATED : June 17, 1997

INVENTOR(S) : Bornhorst

It is certified that error appears in the above-indentified patent and that said Letters Patent is hereby corrected as shown below:

In the Claims

The words " and a controlled power lamp power supply module" should be added to the first sentence of Claim 1, and NOT " power lamp mower supply module" .

Signed and Sealed this

Twenty-third Day of November, 1999

Attest:

Q. TODD DICKINSON

Attesting Officer

*Acting Commissioner of Patents and Trademarks*